(No Model.)
S. SCHLANGEN & I. NEUMANN.
BUNG STOPPER AND BUNG BUSH.
No. 526,464. Patented Sept. 25, 1894.
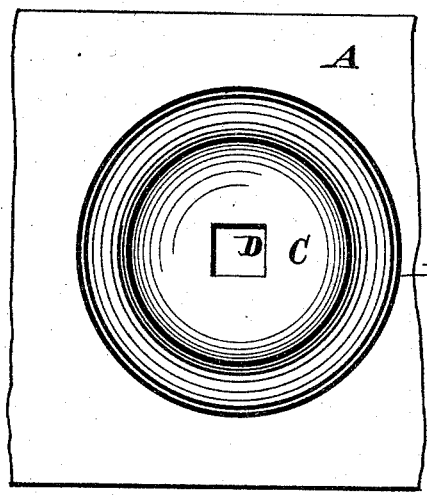
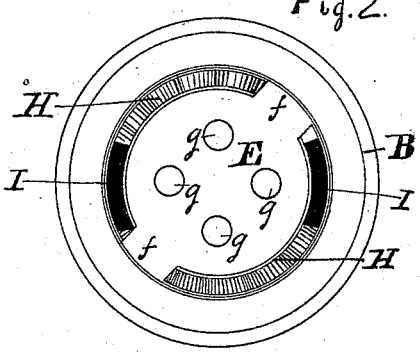
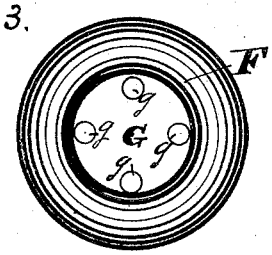
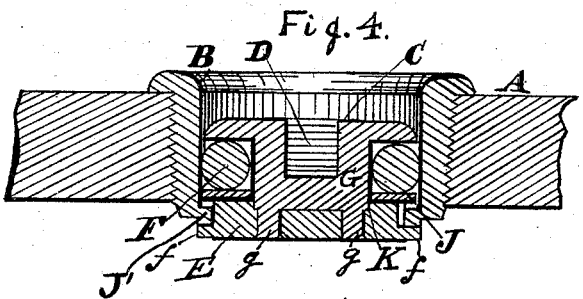
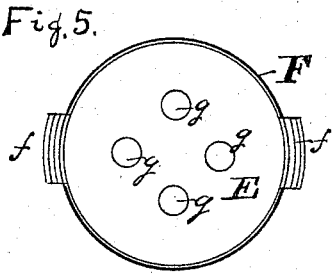
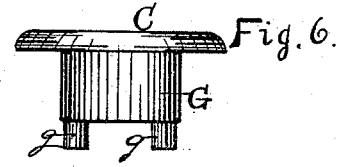
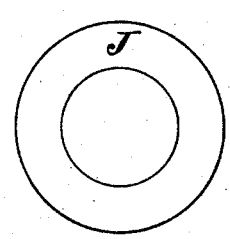
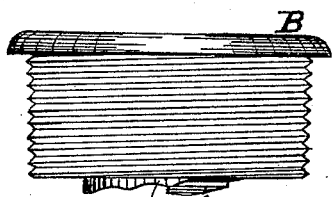
Witnesses:
R. M. Strong
Ellis S. Chesbrough
Inventors.
Simon Schlangen
Ignatz Neumann
By their Attorney
G. D. Chapin.

UNITED STATES PATENT OFFICE.

SIMON SCHLANGEN AND IGNATZ NEUMANN, OF CHICAGO, ILLINOIS.

BUNG-STOPPER AND BUNG-BUSH.

SPECIFICATION forming part of Letters Patent No. 526,464, dated September 25, 1894.

Application filed April 9, 1894. Serial No. 506,900. (No model.)

*To all whom it may concern:*

Be it known that we, SIMON SCHLANGEN and IGNATZ NEUMANN, citizens of the United States, residing in Chicago, county of Cook, and State of Illinois, have jointly invented new and useful Improvements in Bung-Stoppers and Bung-Bushes, of which the following is a specification, reference being had to the accompanying drawings, illustrating the invention, in which—

Figure 1, is a top, or plan view of my improved bung stopper inserted in the bush and the bush inserted in a barrel. Fig. 2, is an inverted view of the bung stopper inserted in the bung bush and the bush removed from the barrel; Fig. 3, an inverted view of the rubber ring inserted on the hub of the bung stopper removed from the bung bush and the ring below the rubber and the cam-plate removed from the hub; Fig. 4, a vertical sectional elevation of the complete device inserted in a barrel; Fig. 5, an inverted view of the complete bung stopper removed from the bung bush; Fig. 6, an elevation of the hub of the bung stopper; Fig. 7, a plan of the ring which lies round the hub and between the rubber and cam-plate, removed; Fig. 8, an elevation of the complete device removed from the barrel.

This invention relates to the construction of a bung stopper and bung bush whereby a rubber ring is compressed laterally between a flange on the hub of the bung stopper and a ring which lies between the cam-plate and the rubber ring; and the radial cams by the turning of the cam-plate are locked in two inclined serpentine racks each opposing notch of which serves to lock the cams so that the bung stopper cannot be removed unless considerable force is applied to a wrench fitted into said hub, as the whole will be readily comprehended by reference to the following detail description.

A, represents that portion of a barrel, or cask into which the bung bush B, is inserted by means of a suitable screw thread on its periphery, in the ordinary manner.

The primary portion of the bung stopper consists of a central cylindrical portion G, which is cast solid with a cap C which projects over the cylinder G in the form of a flange; and also cast solid with rivet-studs $g$. In the middle top portion of the cap is formed a wrench seat D by which and a wrench the bung stopper is to be inserted and removed. A rubber ring F, substantially circular, in cross section, is placed around the cylinder G to bear against the under side of the flange formed by the outward projecting cap C, as shown at Fig. 4. The secondary portion consists of a flat ring J, which is also placed around the cylinder G to bear against the under portion of the rubber ring. The third portion consists of a circular plate E which is recessed out at its top portion at K to engage the periphery of the lower end of the cylinder G, and it is provided with as many vertical holes through it as there are rivet-studs $g$ projecting down from the cylinder G, and also with two opposite lugs $f$ and $f$, which in cross section are convex on their top portions properly to engage the notches or depressions in serpentine cams H, H. The plate E is secured to the cylinder G by the heading down of the rivet-studs $g$.

The bung bush B is of ordinary construction except the serpentine cams mentioned. It is provided with a screw thread to be turned into a barrel or cask, with an internal flange J' at its lower end, opposite slots through which the lugs $f, f$, pass, and also with opposite serpentine cams H and H. The difficulty in the use of plain inclined cams as tightening surfaces for the lugs to operate on, is by handling barrels provided with such devices the lugs become quite readily loosened and the gas from the beer escapes. To remedy this difficulty we have found it necessary to form depressions in the cams H, with rounded intermediate portions so that the lugs will have, when in place, a firm seat; while at the same time the lugs can be turned back to permit the bung stopper to be removed. That this may be accomplished the rubber ring E must contain considerable stock whereby the necessary contraction and expansion may be attained; and further it becomes necessary that the said ring has four bearings within its seat, viz:—one on the under side of the flange of the cap C, one on the cylindrical portion G, one on the ring J, and one against the inside of the bung-bush; all the space for expansion being the difference between the circular rubber in cross section and the square of the seat in which it lies, in cross section. As the devices come from the manufactory, the lugs brought into the first depression in the cams H, will shut off the escape of any pressure of gas which the barrel will withstand; but after considerable use the lugs can be inserted in the second depressions. These statements are made from a thorough test of the device. The novelty is fully set forth in the claim; therefore any other construction not containing the elements claimed would not contain our invention.

We claim as new and desire to secure by Letters Patent of the United States—

A bung stopper consisting of a central cylindrical portion, an integral cap forming a flange at the top of said stopper, a rubber ring circular in cross section placed on the cylindrical portion to bear against the flange, a flat ring placed on the cylindrical portion below the rubber ring, a circular plate below the flat ring and connected with the cylinder and provided with opposite lugs which are convex on their top portions in combination with a bung bush provided with opposite serpentine cams on the under side of its internal flange, and the rubber ring having four bearings within its seat, as and for the purpose specified.

SIMON SCHLANGEN.
IGNATZ NEUMANN.

Witnesses:
G. L. CHAPIN,
EDWARD SEAMANN.